United States Patent
Hahn et al.

(10) Patent No.: US 9,949,125 B2
(45) Date of Patent: Apr. 17, 2018

(54) METHOD FOR AUTHENTICATING TERMINAL IN WIRELESS COMMUNICATION SYSTEM, AND DEVICE FOR SAME

(71) Applicant: LG ELECTRONICS INC., Seoul (KR)

(72) Inventors: Genebeck Hahn, Seoul (KR); Jaehoon Chung, Seoul (KR); Eunjong Lee, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/501,791

(22) PCT Filed: May 19, 2015

(86) PCT No.: PCT/KR2015/005001
§ 371 (c)(1),
(2) Date: Feb. 3, 2017

(87) PCT Pub. No.: WO2016/021817
PCT Pub. Date: Feb. 11, 2016

(65) Prior Publication Data
US 2017/0223538 A1    Aug. 3, 2017

Related U.S. Application Data

(60) Provisional application No. 62/032,640, filed on Aug. 4, 2014.

(51) Int. Cl.
*H04M 1/66* (2006.01)
*H04W 12/06* (2009.01)
(Continued)

(52) U.S. Cl.
CPC .......... *H04W 12/06* (2013.01); *H04W 12/04* (2013.01); *H04W 76/02* (2013.01)

(58) Field of Classification Search
CPC .... H04W 12/06; H04L 63/0892; H04L 69/40; H04L 9/32; G06F 21/31; G06Q 30/02
(Continued)

(56) References Cited

U.S. PATENT DOCUMENTS

2013/0301611 A1    11/2013  Baghel et al.
2017/0318452 A1*   11/2017  Hahn ................. H04W 8/20

FOREIGN PATENT DOCUMENTS

| KR | 20130038774 | 4/2013 |
| KR | 20140043484 | 4/2014 |
| WO | 2013082984 | 6/2013 |

OTHER PUBLICATIONS

PCT International Application No. PCT/KR2015/005001, Written Opinion of the International Searching Authority dated Aug. 24, 2015, 25 pages.

* cited by examiner

*Primary Examiner* — Charles Shedrick
(74) *Attorney, Agent, or Firm* — Lee, Hong, Degerman, Kang & Waimey PC

(57) ABSTRACT

A method for performing authentication by a base station with a terminal in a wireless communication system, according to an embodiment of the present invention, comprises the steps of: receiving from a terminal a radio resource control (RRC) connection setup request message; determining, on the basis of the RRC connection setup request message, whether or not the terminal requested fast authentication; if the terminal requested fast authentication, transmitting an international mobile subscriber identity (IMSI) of the terminal to a mobility management entity (MME) before the RRC connection setup of the terminal is complete; and (Continued)

authenticating the terminal on the basis of the control of the MME, wherein, in the step for authenticating the terminal, non-access stratum (NAS) security setup and access stratum (AS) security key setup of the terminal are simultaneously performed.

13 Claims, 11 Drawing Sheets

(51) Int. Cl.
     *H04W 12/04*      (2009.01)
     *H04W 76/02*      (2009.01)

(58) Field of Classification Search
     USPC .......................................................... 455/411
     See application file for complete search history.

FIG. 2
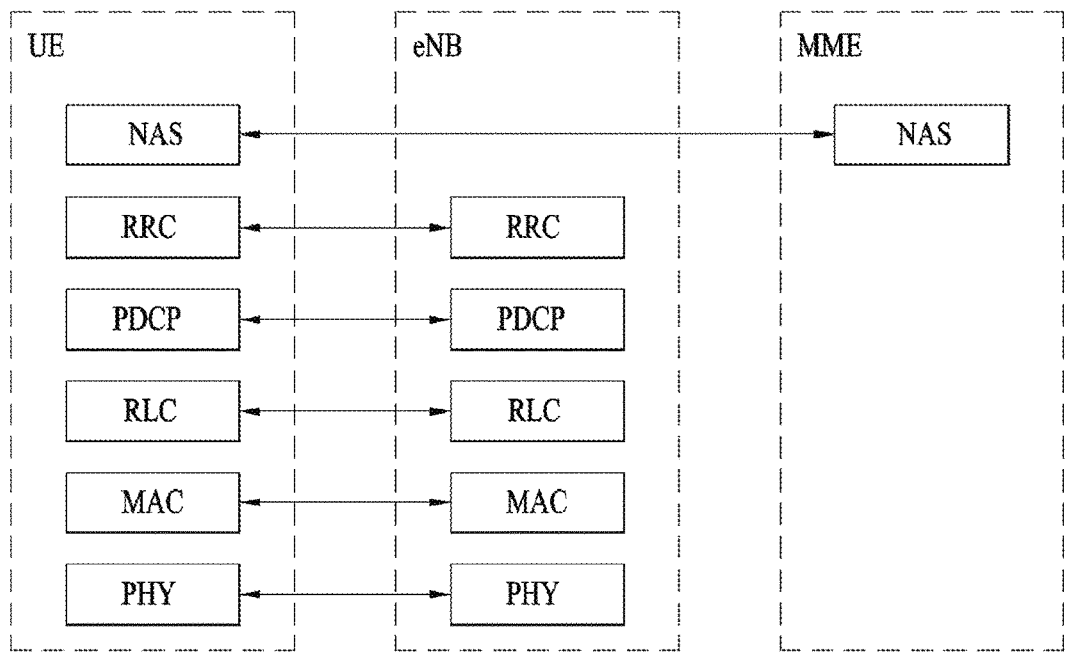
(a) CONTROL-PLANE PROTOCOL STACK
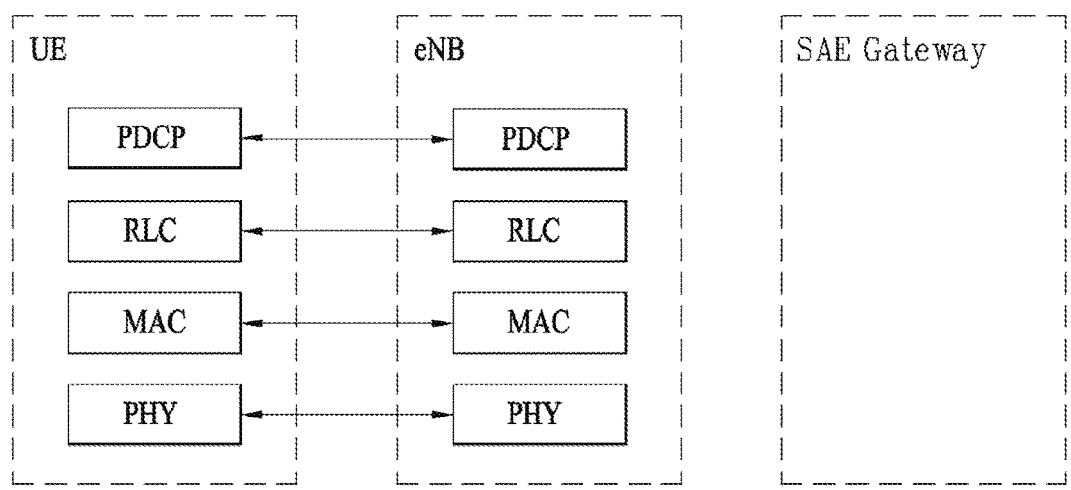
(b) USER-PLANE PROTOCOL STACK

METHOD FOR AUTHENTICATING TERMINAL IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2015/005001, filed on May 19, 2015, which claims the benefit of U.S. Provisional Application No. 62/032,640, filed on Aug. 4, 2014, the contents of which are all hereby incorporated by reference herein in their entirety.

TECHNICAL FIELD

The present invention relates to a wireless communication system, and more particularly, to a method and apparatus for performing mutual authentication between a user equipment and a base station in a wireless communication system.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, the technical task of the present invention is to provide a method and apparatus for authenticating a user equipment quickly and efficiently in a wireless communication system.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of performing authentication by a base station with a user equipment in a wireless communication system, including receiving a radio resource control (RRC) connection setup request message from the user equipment, determining whether the user equipment has requested fast authentication based on the RRC connection setup request message, if the user equipment has requested the fast authentication, transmitting an international mobile subscriber identity (IMSI) of the user equipment to a mobility management entity (MME) before completion of an RRC connection setup of the user equipment, and authenticating the user equipment under control of the MME, wherein the authenticating the user equipment comprises performing a non-access stratum (NAS) security key setup and an access stratum (AS) security key setup of the user equipment simultaneously.

In another technical aspect of the present invention, provided herein is a base station in performing authentication with a user equipment in a wireless communication system, including a receiver to receive a radio resource control (RRC) connection setup request message from the user equipment, a processor to determine whether the user equipment has requested fast authentication based on the RRC connection setup request message, and to authenticate the user equipment, and a transmitter to transmit an international mobile subscriber identity (IMSI) of the user equipment to a mobility management entity (MME) before completion of an RRC connection setup of the user equipment, if the user equipment has requested the fast authentication, wherein the processor simultaneously performs a non-access stratum (NAS) security key setup and an access stratum (AS) security key setup of the user equipment under control of the MME.

Preferably, the base station may determine whether the user equipment has requested the fast authentication depending on whether at least one of the IMSI and a fast authentication indication is included in the RRC connection setup request message. More preferably, if the IMSI included in the RRC connection setup request message is a type of protecting location privacy of the user equipment, it may be determined that the user equipment has requested the fast authentication. Moreover, the base station may receive an RRC connection setup complete message from the user equipment. If the user equipment has not requested the fast authentication, the IMSI may be included in the RRC setup complete message.

If determined that the user equipment has not requested the fast authentication, the base station may transmit the IMSI of the user equipment to the MME after completion of the RRC connection setup of the user equipment.

Preferably, if determined that the user equipment has not requested the fast authentication, the base station may perform the AS security key setup sequentially after the NAS security key setup has been performed.

Preferably, the base station may deliver a first security mode command (SMC) message including the NAS security key setup and the AS security key setup received from the MME to the user equipment in response to a request from the MME.

In further technical aspect of the present invention, provided herein is a method of performing authentication by a user equipment with a base station in a wireless communication system, including transmitting a radio resource control (RRC) connection setup request message to the base station, receiving an RRC connection setup message from the bae station, transmitting an RRC connection setup complete message, and performing the authentication with the base station, wherein if the user equipment has requested fast authentication, an international mobile subscriber identity (IMSI) of the user equipment is included in the RRC connection setup request message instead of the RRC connection setup complete message.

Preferably, if the fast authentication has been requested, a non-access stratum (NAS) security key setup and an access stratum (AS) security key setup of the user equipment may be performed simultaneously.

The RRC connection setup request message may further include a fast authentication indication.

The IMSI included in the RRC connection setup request message may be a type of protecting location privacy of the user equipment.

If the user equipment has not requested the fast authentication, the AS security key setup may be performed sequentially after the NAS security key setup has been performed.

Advantageous Effects

According to an embodiment of the present invention, a user equipment and a base station can perform mutual authentication quickly and efficiently in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram illustrating structures of a control plane and a user plane of a radio interface protocol between a UE and an E-UTRAN based on the 3GPP radio access network specification.

FIG. 12 is a diagram of a user equipment and a base station according to one embodiment of the present invention.

MODE FOR INVENTION

Figure 1:
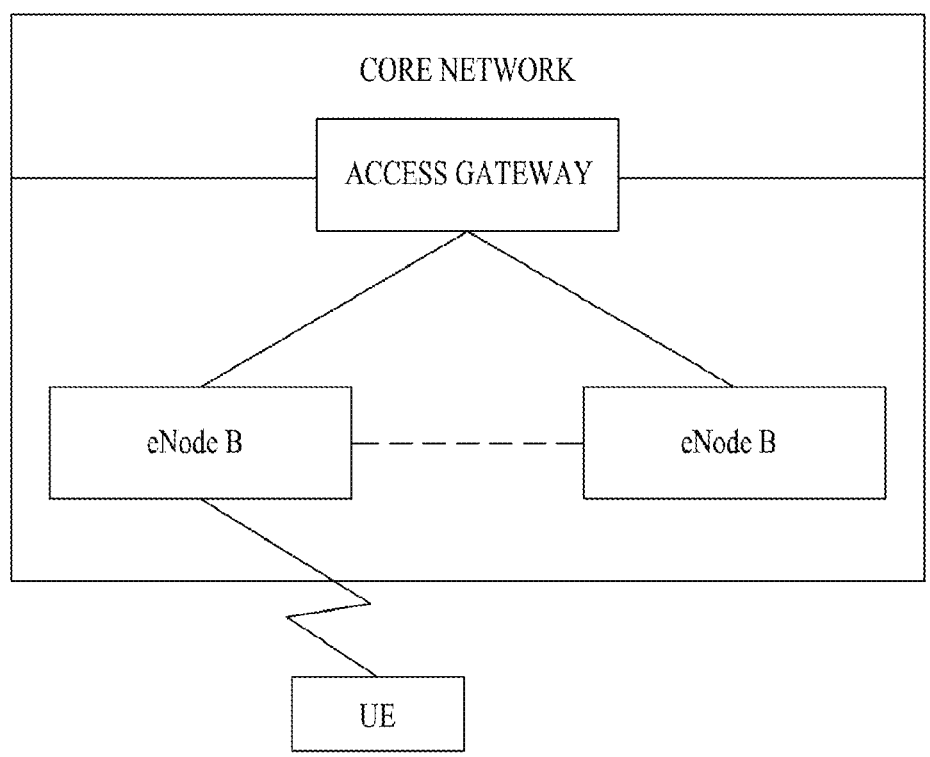
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting a base station eNB is set to one of bandwidths of 1.4, 3.5, 5, 10, 15, and 20 MHz and provides a downlink or uplink transmission service to several UEs. At this time, different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
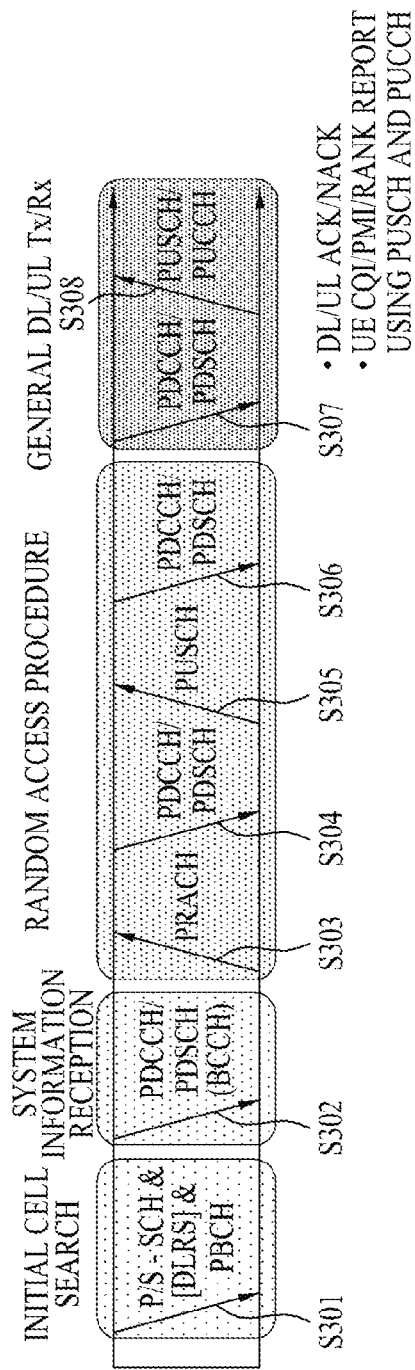
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301) this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
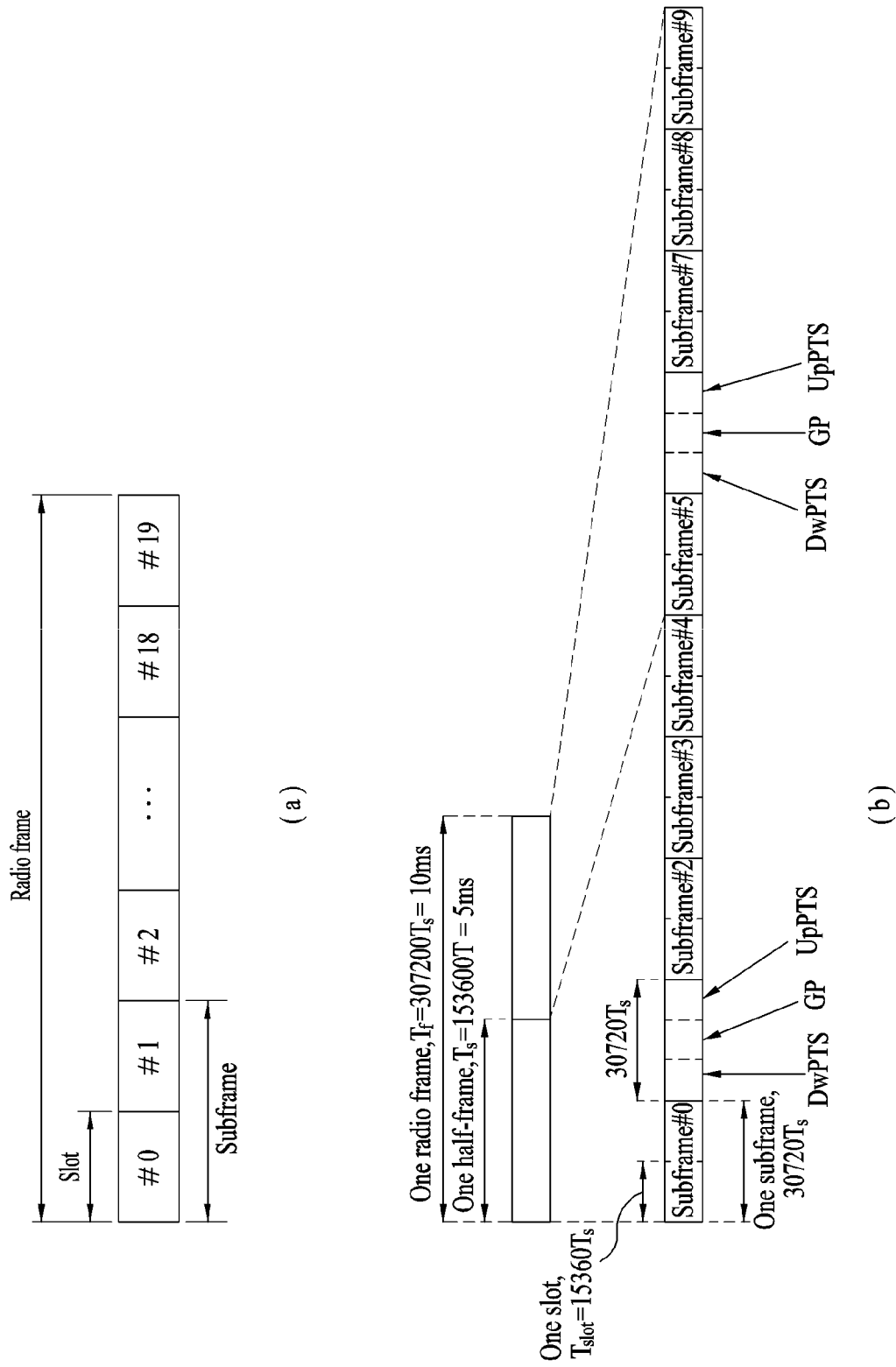
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms (15360 $T_s$). In this case, $T_s$ denotes a sampling time represented by $T_s=1/(15 \text{ kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

PSS(Primary synchronous signal)/SSS(Secondary Synchronous Signal)

Figure 5:
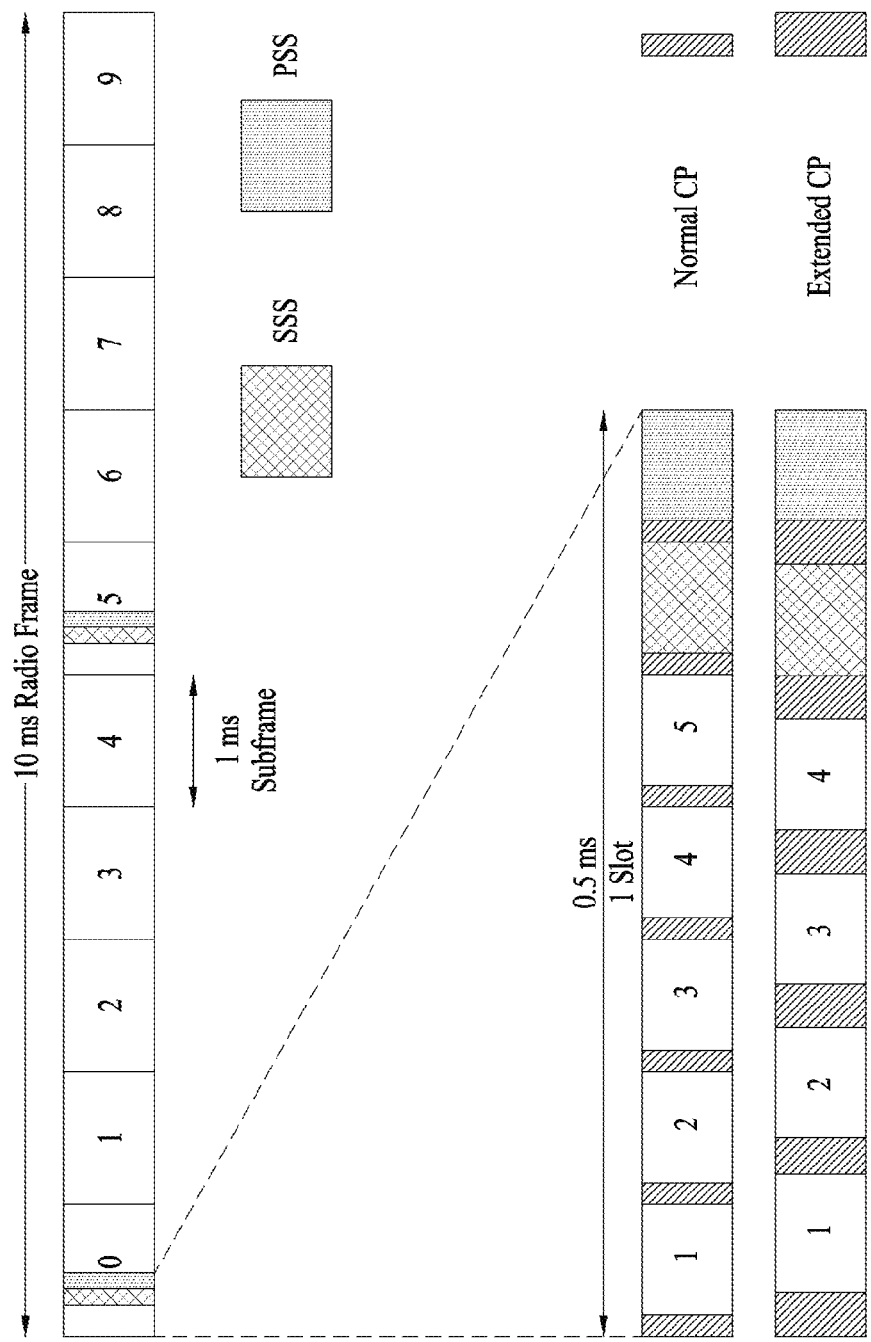
FIG. 5 is a diagram to describe synchronization signals PSS and SSS used for a cello search in LTE/LTE-A system.

FIG. 5 is a diagram illustrating a PSS and an SSS, which are synchronous signals used for cell search in an LTE/LTE-A system. Cell search will be described prior to description of the PSS and the SSS. When the user equipment is initially connected to a cell, cell search is performed if a user equipment performs handover from a cell, to which the user equipment is currently connected, to another cell, or is performed for cell reselection. Cell search may be performed by frequency and symbol synchronous acquisition of the cell, downlink frame synchronous acquisition of the cell, and determination of cell identifier (ID). Three cell IDs may constitute one cell group, and 168 cell groups may exist.

For cell search, a base station transmits the PSS and the SSS. The user equipment may acquire 5 ms timing of the cell by detecting the PSS and identify cell ID within the cell group. Also, the user equipment may identify radio frame timing and cell group by detecting the SSS.

Referring to FIG. 5, the PSS is transmitted from the subframes 0 and 5. In more detail, the PSS is transmitted from the last OFDM symbol of the first slot at the subframes 0 and 5. Also, the SSS is transmitted from the last second OFDM symbol of the first slot of the subframes 0 and 5. That is, the SSS is transmitted from the OFDM symbol just before the PSS is transmitted. This transmission timing corresponds to FDD (Frequency Division Duplex). In case of TDD (Time Division Duplex), the PSS is transmitted from the third symbol of the subframes 1 and 6, that is, DwPTS, and the SSS is transmitted from the last symbol of the subframes 0 and 5. That is, in the TDD, the SSS is transmitted prior to the PSS as much as three symbols.

The PSS is a Zadoff-Chu sequence of length 63, and in real transmission, 0 is padded at both ends of the sequence, whereby the sequence is transmitted onto 73 subcarriers (72 subcarriers except DC subcarrier, that is, 6 RBs) in the middle of a system frequency bandwidth. The SSS is a sequence of length 62, which is obtained as two sequences of length 31 are frequency-interleaved, and is transmitted onto 72 subcarriers in the middle of a full system bandwidth in the same manner as the PSS.

PBCH (Physical Broadcast Channel)

Figure 6:
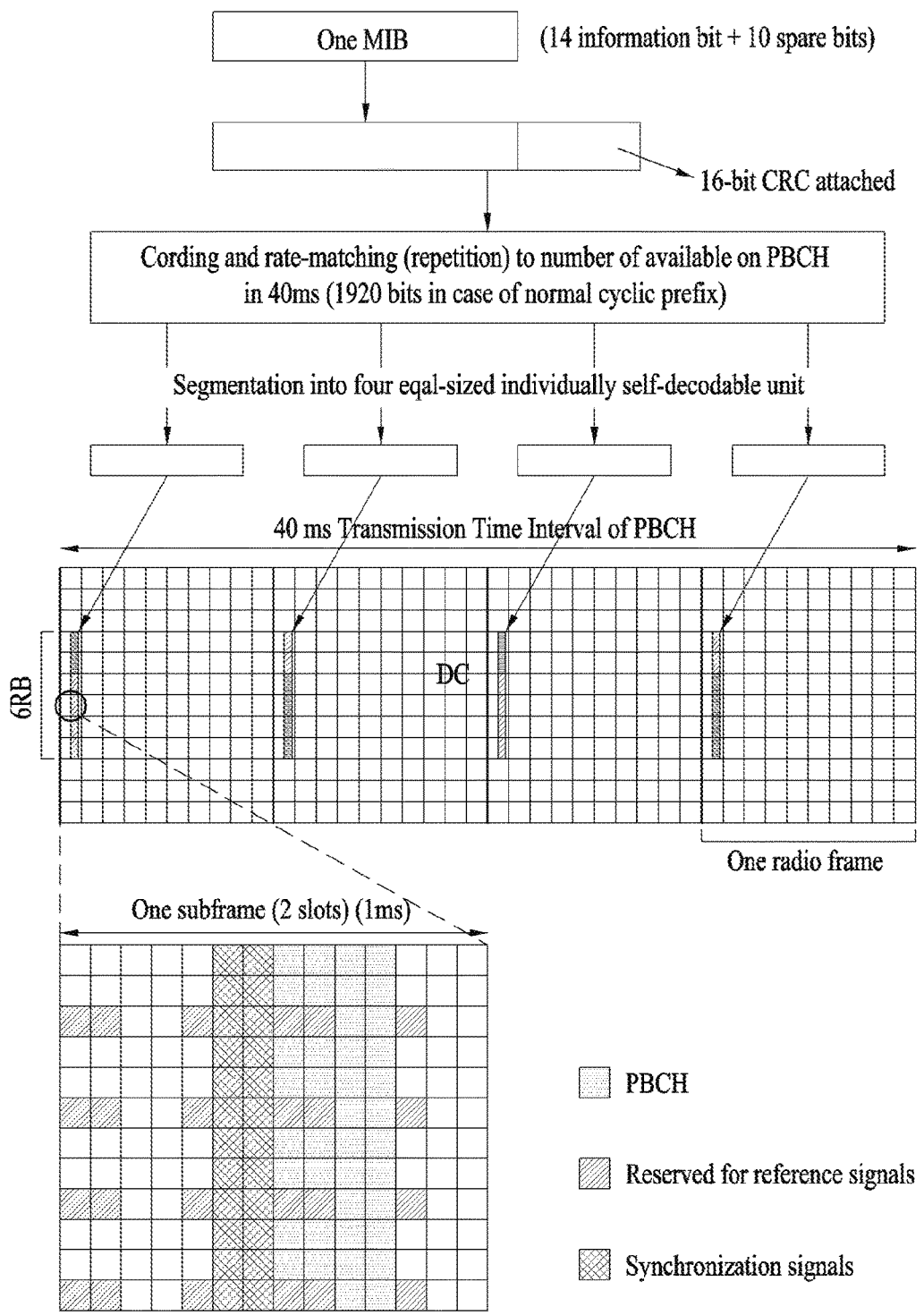
FIG. 6 is a diagram to describe PBCH.

FIG. 6 is a diagram illustrating a physical broadcast channel (PBCH). The PBCH is the channel to which system information corresponding to a master information block (MIB) is transmitted, and is used to allow the user equipment to system information after acquiring downlink synchronization and cell ID through the aforementioned PSS/SSS. In this case, the MIB may include downlink cell bandwidth information, PHICH configuration information, subframe number (SFN), etc.

One MIB, as shown in FIG. 6, is transmitted through a first subframe of each of four continuous radio frames. In more detail, the PBCH is transmitted from first four OFDM symbols of the second slot of the subframe 0 at four continuous radio frames. Accordingly, the PBCH for transmitting one MIB is transmitted at a period of 40 ms. The PBCH is transmitted on 72 subcarriers in the middle of the full bandwidth on a frequency axis, which correspond to the smallest downlink bandwidth, 6 RBs. This is to allow the user equipment to decode BCH without problem even though the user equipment does not know the size of the full system bandwidth.

Meanwhile, in 5G mobile communication, currently considered is a method of providing a user with a multimedia service of a real sense, e.g., a command and response by vision, hearing, or tactility, etc. for the experience of such a real sense, a delay of a control plane of a user equipment needs to be reduced to be smaller than a current system. In a current system, if a user equipment performs an initial access (Initial Attach), through an access request procedure or NAS procedure (e.g., service request, tracking area update request, etc.), configured are a session and default bearer embracing authentication of user equipment, key setup for AS/NAS (access stratum/non-access stratum) between a user equipment and a base station/MME (mobility management entity), DRB (data radio bearer), S1 bearer and S5 bearer configurations through base station/S-GW/P-GW (serving-gateway/packet data network-gateway), and the like. For such an existing initial attach, considerable time is consumed. In EPC (evolved packet core) of LTE/LTE-A system, an authentication procedure may be performed depending on whether a user equipment has information (Old GUTI, NAS Security Context) used for a previous access to a network and whether the network (MME) has user information (UE Context) including user's ID, or may not. Hence, in order to reduce time taken to provide a user with services sensitive to a delay, required is a method for reducing time consumed for the authentication and key configuration procedure induced by a presence or non-presence of the information retained by the user equipment or network (MME).

In the present specification, proposed is a method for reducing a delay related to authentication and key configuration induced according to a state of a user equipment or network for NAS procedures such as an access request procedure including in initial access of a user equipment, a service request procedure for a low-delay service acquisition of a user equipment, a TAU procedure for updating its own location to a network (MME) and the like. According to one embodiment, an identifier of a user equipment is quickly delivered to a core network (CN) entity (e.g., MME) and the core network can perform both procedures of AS key configuration and NAS key configuration simultaneously. Hence, it is able to reduce authentication/key configuration delay of an initial access for users intending to be provided with a service sensitive to a delay.

Figure 7:
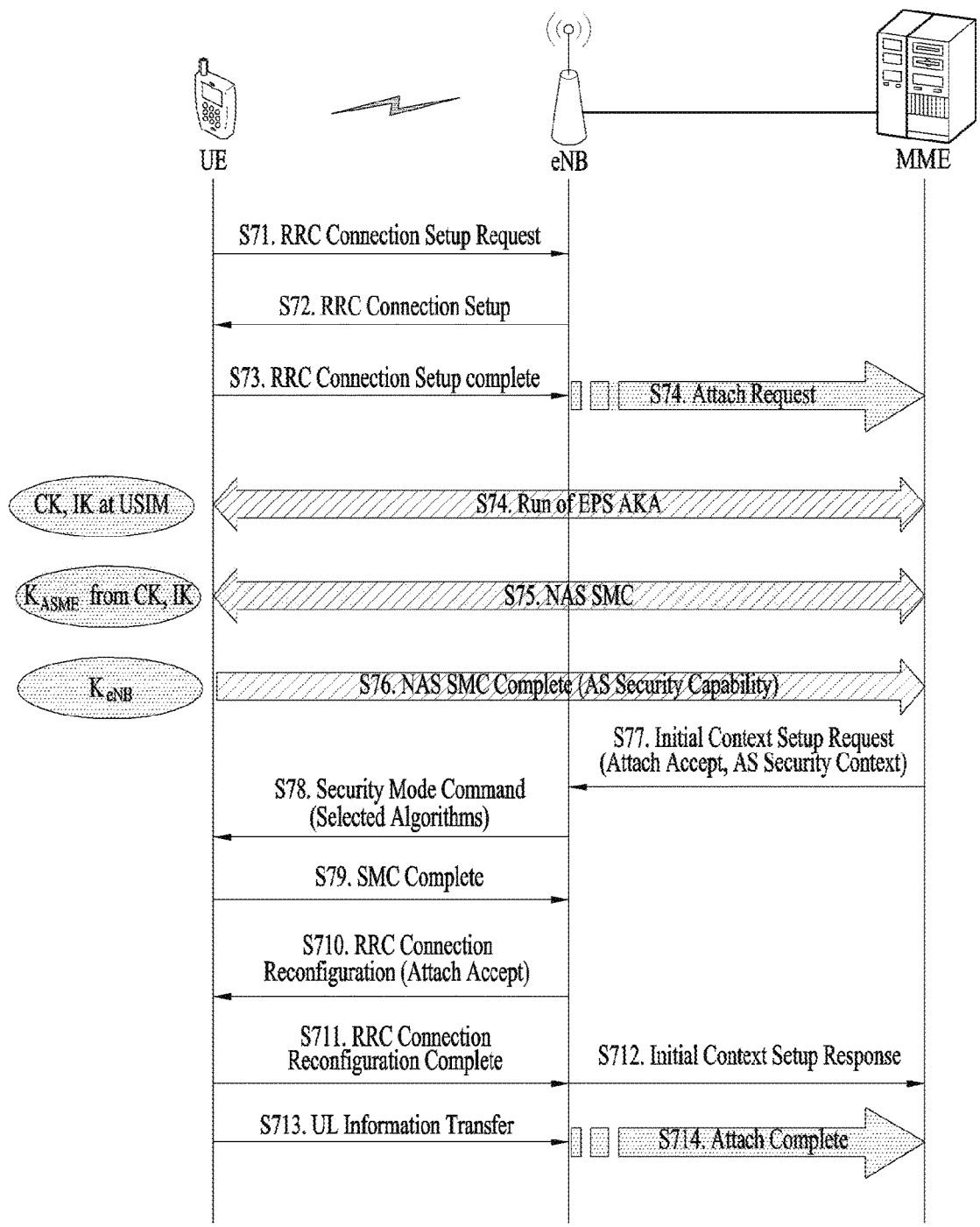
FIG. 7 is a diagram for one example of an authentication procedure in case of initial access of a user equipment.

FIG. 7 is a diagram for one example of an authentication procedure in case of initial access of a user equipment. A key activation procedure shown in FIG. 7 includes authentication of a user equipment and a key configuration for a user equipment.

A user performs the aforementioned random access and sets up an RRC connection to a base station (eNB) [S71 to S73].

Once the RRC connection is set up, the base station makes a request for an access of a UE (user equipment) to an MME [S74]. Having received the access request, the MME identifies the UE with international mobile subscriber identity (IMSI) and makes a request for an authentication vector for authenticating the user equipment to an HSS (home subscriber server) (not shown). The HSS provides the MME with authentication vectors including KASME.

The MME performs an EPS AKA (authentication and key agreement) procedure through authentication vectors [S75]. The MME selects one of the authentication vectors and then performs the mutual authentication with the UE. If the mutual authentication is successful, the UE and the MME have the same $K_{ASME}$. The $K_{ASME}$ is a highest level key in an access network.

After the UE and the MME finish the mutual authentication and share the $K_{ASME}$, the MME delivers security mode command (SMC) message to the UE [S76]. Through this, a non-access stratum (NAS) security setup procedure is initiated. The NAS security is provided for safely delivering a signaling message between UE and MME in radio link and performs integrity check and ciphering on an NAS signaling message. NAS security keys are obtained from $K_{ASME}$, and NAS security setup procedure is a procedure for obtaining NAS security keys.

Having received security mode command (SMC) message, the UE verifies integrity for the received message using the NAS integrity algorithm selected by the MME. The UE obtains NAS security keys from $K_{ASME}$ using NAS integrity/ciphering algorithm.

Having obtained the NAS security keys, the UE sends SMC complete message to the MME [S77]. If the NAS security setup is complete, NAS signaling messages are ciphered by the NAS security keys and integrity-protected.

If the NAS security setup is complete, the base station sends security mode command (SMC) message to the UE [S79]. Through this, an access stratum (AS) security setup procedure between the UE and the base station starts. The AS security is provided to safely deliver data between the UE and the base station. Particularly, the AS security performs integrity check and ciphering on an EEC signaling message in a control plane and also performs ciphering on IP packets in a user plane. The AS security setup procedure is a procedure for obtaining AS security keys. The AS security keys are obtained from $K_{eNB}$. The MME creates $K_{eNB}$ from $K_{ASME}$ and then forwards it to the base station. The security mode command (SMC) message includes AS security algorithms selected by the base station and message authentication code (MAC-I: message authentication code for integrity).

Having received the SMC message, the UE sends SMC complete message containing the MAC-I created by the UE to the base station [S710]. For instance, the UE verifies integrity for a received message using AS integrity algorithm selected by the base station and obtains AS security keys using AS integrity/ciphering algorithm. If the base station receives the SMC complete message and succeeds in integrity verification using the AS integrity key, the AS security setup is successfully completed. By the AS security keys, RRC signaling messages between the UE and the base station are ciphered and integrity-protected and user IP packets are ciphered.

Figure 8:
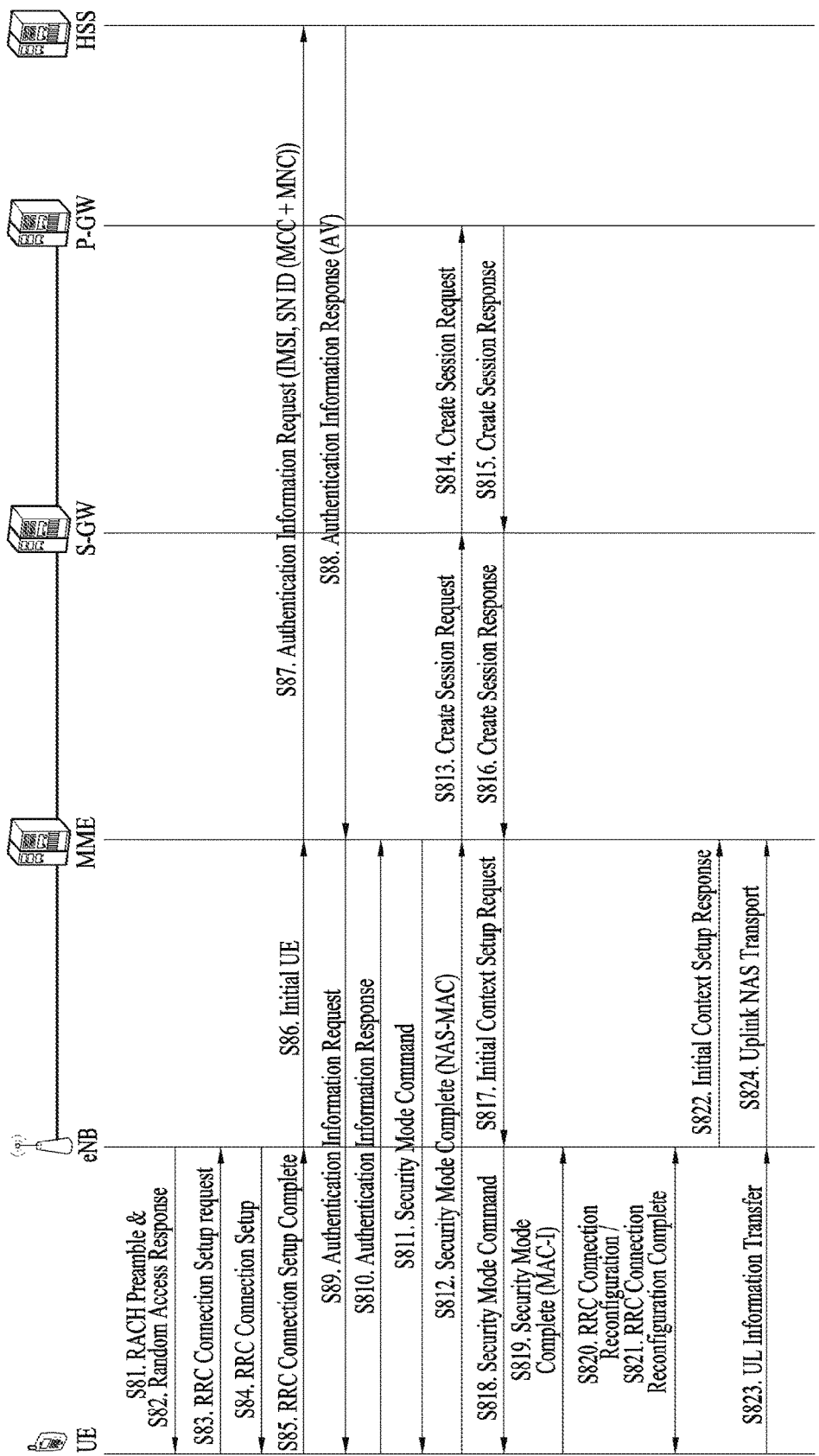
FIG. 8 is a diagram to illustrate the authentication procedure of FIG. 7 in detail.

FIG. 8 is a diagram to illustrate the authentication procedure of FIG. 7 in detail. Contents redundant with FIG. 7 shall be omitted. A procedure shown in FIG. 8 lists parts essentially performed in case of an initial access of a UE but excludes parts that can be selectively performed according to some situations.

With reference to the procedure shown in FIG. 8, a delay consumed for an initial access to a user's network in a current LTE/LTE-A system is shown in Table 1 and Table 2.

TABLE 1

| Description | Time (ms) |
| --- | --- |
| Average delay due to RACH scheduling period (1 ms RACH cycle) | 0.5 |
| RACH Preamble | 1 |
| Preamble detection and transmission of RA response (Time between the end RACH transmission and UE's reception of scheduling grant and timing adjustment) | 3 |
| UE Processing Delay (decoding of scheduling grant, timing alignment and C-RNTI assignment + L1 encoding of RRC Connection Request) | 5 |
| Transmission of RRC and NAS Request | 1 |
| Processing Delay in eNB (L2 and RRC) | 4 |
| Transmission of RRC Connection Set-up (and UL grant) | 1 |
| Processing Delay in the UE (L2 and RRC) | 12 |
| Total Delay (RACH) | 27.5 |

TABLE 2

| Components | Description | Time (ms) |
| --- | --- | --- |
| S85 | Transmission of RRC Connection Set-up Complete | 1 |
| S86 | Processing Delay in eNB (Uu → S1-C) + S1-C Transfer Delay (→ Initial UE) | 12.5 |
| S87-S88 | {MME Processing Delay (including UE context retrieval of 10 ms) + Transfer Delay (between MME & HSS)} + {HSS Processing Delay + Transfer Delay (between HSS & MME)} (→ Authentication Information Request/Response) | 100 |
| S89-S810 | {MME Processing Delay + Transfer Delay (between MME & UE)} + {Processing Delay in UE + Transfer Delay (between UE & MME)} (→ Authentication Request/Response) | 40 |
| S811-S812 | {MME Processing Delay + Transfer delay (between MME & UE)} + {Processing delay in UE + Transfer delay (between UE & MME)} (→ Security Mode Command/Security Mode Complete) | 40 |
| S813-S816 | EPS Session Establishment {MME Processing Delay + Transfer Delay (between MME & S-GW)} + {S-GW Processing Delay + Transfer Delay (between S-GW & P-GW)} + {P-GW Processing Delay + Transfer Delay (between P-GW & S-GW)} + {Processing Delay in S-GW + Transfer Delay (between S-GW & MME)} (→ Create Session Request/Response) | 100 |
| S817 | MME Processing Delay + S1-C Transfer Delay (→ Initial Context Setup Request) | 13.5 |
| S818-S819 | {Processing Delay in eNB + Transmission of Security Mode Command} + {Processing Delay in UE + Transmission of Security Mode Complete} | 22 |
| | Total Delay (Authentication & AS/NAS Key Setup) | 329 (356.5) |

According to Table 1 and Table 2, a delay consumed for an RACH procedure and an authentication and AS/NAS key setup procedure amounts to '27.5 ms+329 ms=356.5 ms'.

As mentioned in the foregoing description, in order to perform UE's initial authentication, a UE should perform an initial access procedure. In this case, the UE sequentially performs authentication, NAS key setup, and S1 and S5/S8 session setup, and then completes the AS key setup based on user context delivered to the base station from the MME. In the course of performing such an access procedure, the delay described with reference to Table 1 or Table 2 occurs.

Meanwhile, a delay may occur in case that an MME is unable to recognize IMSI that is a user identifier as well as case of an authentication procedure for a UE's initial access. For instance, such a case may include one of the following cases: (i) After a UE has normally completed access release (detach) from a network in advance, although the UE accesses an MME again using GUTI, a case that the MME fails to have a previous user access information on the UE (Case that MME is not changed); (ii) After a UE has normally completed access release (detach) from a network in advance, although the UE accesses an MME again using GUTI and the MME has a previous user access information on the UE, a case that NAS-MAC verification is not successful (Case that MME is not changed); (iii) After a UE has normally completed access release (detach) from a network in advance, when the UE accesses an MME again using GUTI, although the MME makes a request for a previous user access information on the UE to a previous MME, a case that the previous MME fails to have the previous user access information on the UE (Case that MME is changed); (iv) After a UE has normally completed access release (detach) from a network in advance, when the UE accesses an MME again using GUTI, although the MME makes a request for a previous user access information on the UE to a previous MME and the previous MME has the previous user access information on the UE, a case that NAS-MAC verification for an access request is not successful (Case that MME is changed); and (v) As signals of a normal base station are drowned in a fake base station, a case that the fake base station makes a request for IMSI to a user.

If there is no user ID or user access information, since it is difficult to identify IMSI, an authentication procedure is performed. Such an authentication procedure may apply to other NAS procedures (e.g., service request, TAU request, etc.) as well as to the initial access shown in FIG. 7 or FIG. 8. In case of the TAU (tracking area update) request procedure according to a location change of a UE, such a procedure is similar to an access request procedure. In case of a service request, since a UE is registered at a network (MME), the MME maintains context for the UE irrespective of MME change. Hence, an authentication procedure may be triggered according to integrity for the service request.

In the following description, a method of reducing user's authentication delay is described. Proposed is a method for reducing a delay related to authentication and key setup in case of UE/s access request (or, according to a status of a network for other several NAS procedures). According to the proposed method, a user identifier of a UE is quickly delivered to an MME. Then, the MME simultaneously performs both AS/NAS key setups through it. To this end, the MME delivers security context to a base station more quickly, whereby AS key can be configured quickly.

Figure 9:
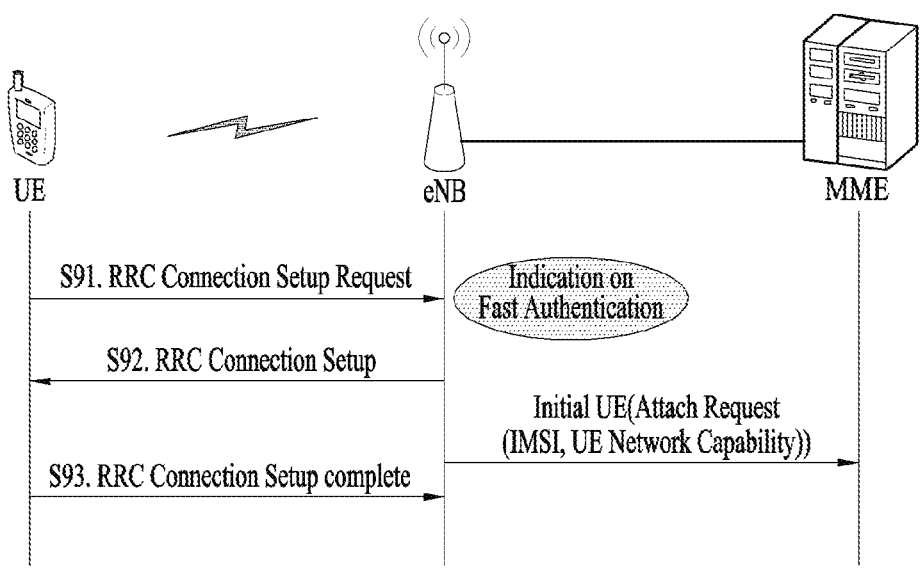
FIG. 9 is a diagram to illustrate a method of transmitting a UE identifier in case of initial access according to one embodiment of the present invention.

FIG. 9 is a diagram to illustrate a method of transmitting a UE identifier in case of initial access according to one embodiment of the present invention. According to the present embodiment, a UE identifier is delivered to an MME more quickly and the MME simultaneously performs an AS key setup process and a NAS key setup process. To this end, the MME quickly delivers security context to a base station.

Moreover, in order to quickly perform authentication in case of an initial access, a time for a UE to send an access request message through RRC connection may be advanced. In an existing initial access procedure, a UE sends an RRC connection request message to a base station and then receives an RRC connection setup message. Thereafter, the UE sends an RRC connection setup complete message to the base station in a manner that IMSI which is a user's permanent identifier is contained in the RRC connection setup complete message.

Referring to FIG. 9, a UE sends an RRC connection setup request message containing IMSI [S91]. Unlike an existing one, the IMSI that is a user's identifier is contained in the RRC connection setup request message. Meanwhile, according to one embodiment, the RRC connection setup request message may further contain an indication for fast authentication.

According to another embodiment, an IMSI of a new type capable of protecting user's location privacy can be used instead of an existing IMSI. Thus, if the IMSI of the new type is used, it can be defined that fast authentication is implicitly indicated. For instance, the UE sends the RRC connection setup request message, which contains a pseudo-IMSI of a new type without a separate indication for fast authentication, to the base station.

Through this, before the RRC connection setup, the base station may obtain an IMSI value necessary for user authentication in advance. Having obtained IMSI, the base station sends an RRC connection setup message to the UE and also sends a UE access request to the MME [S92]. According to a related art method, after RRC connection setup between a UE and a base station has been completed, a UE access request is performed. Yet, according to the present invention, a UE access request can be made before RRC connection setup completion. And, IMSI may be contained in the UE access request.

The UE sends an RRC connection setup complete message to the base station [S93].

Figure 10:
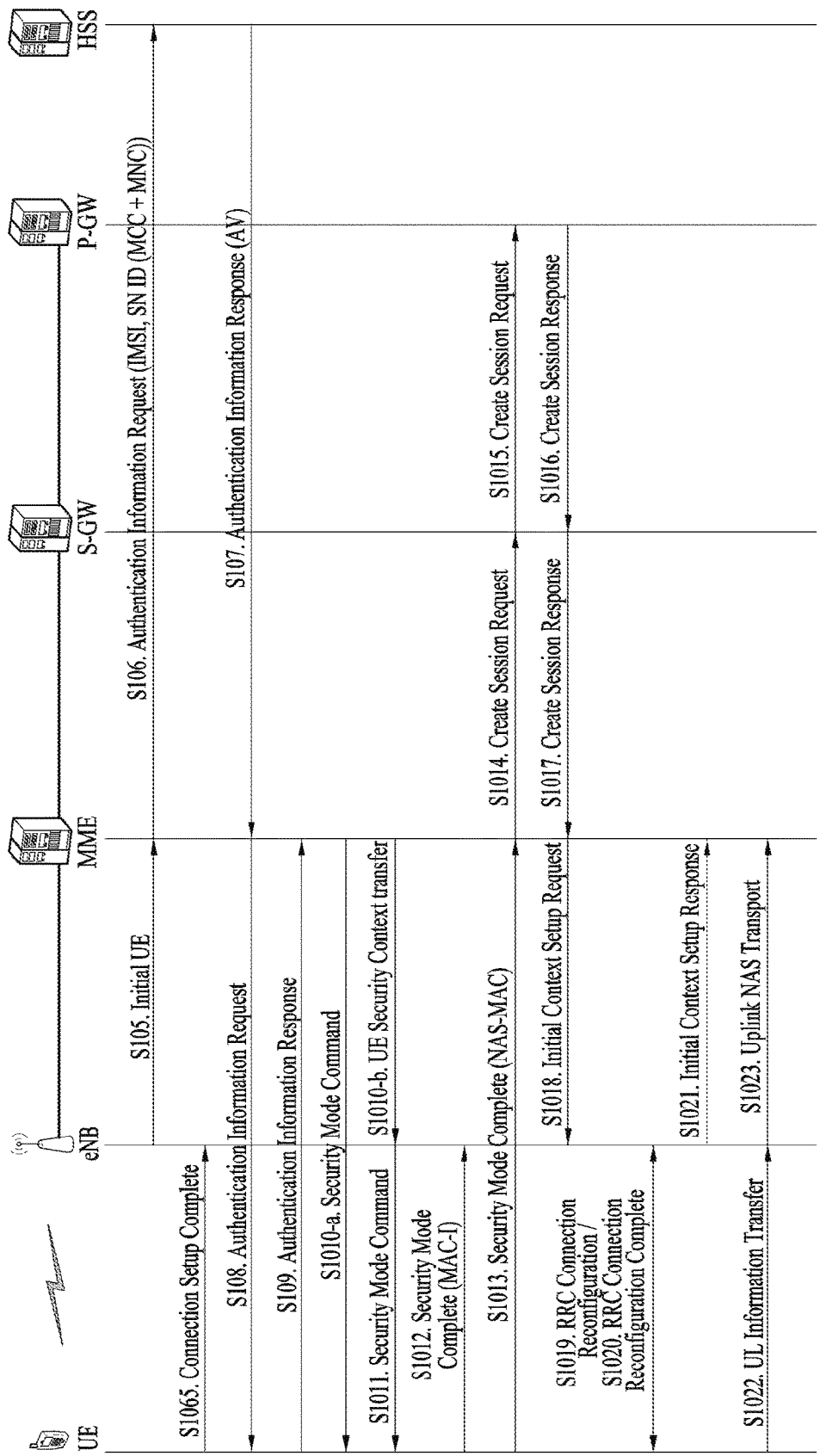
FIG. 10 is a diagram to illustrate a method of setting an authentication and security key according to one embodiment of the present invention.

FIG. 10 is a diagram to illustrate a method of setting an authentication and security key according to one embodiment of the present invention.

Like FIG. 9, assume that a base station receives an RRC connection request message from a UE and sends an RRC connection setup message to the UE.

A base station sends a UE access request message to an MME [S105]. Meanwhile, the base station does not wait for an RRC connection setup complete message from a UE but is able to send an access request message to the MME through an initial UE message defined in S1 Protocol. The UE access request message may contain an IMSI of a user identifier or an IMSI of a new type capable of protecting location privacy. If the base station sends the RRC connection setup message to the UE, it means that contention resolution in a UE's random access is completed. By receiving an existing IMSI, the MME instantly identifies the UE. Or, the MME receives a new IMSI capable of protecting location privacy and is then able to identify the UE by restoring the existing IMSI through the new IMSI.

Having identified the UE, the MME makes a request for authentication information required for UE's authentication to an HSS [S106]. The request for the authentication information may contain an IMSI used in identifying the UE.

The HSS creates authentication information and then sends it to the MME [S107].

The MME transceives NAS message with the UE, thereby performing mutual authentication [S108, S109].

In order to simultaneously perform AS key setup and NAS key setup for the UE, the MME performs key setup of NAS through NAS security mode command (SMC) message [S1010-1], and simultaneously, sends security text for the UE for the AS key setup to the base station [S1010-*b*]. To this end, UE security context delivery message may be newly defined on an S1 interface. The security context may contain a seed key $K_{eNB}$ for key setup of AS and information such as UE's security capability and the like. Meanwhile, for SM delivery of NAS,DL NAS delivery message defined on S1 interface may be used between the base station and the MME, and DL information delivery message defined on RRC may be used between the base station and the UE.

Having received the UE's security context from the MME, the base station sends SMC message for key setup of AS to the UE [S1011].

The UE sends SMC (security mode complete) message, which means that the key setup of AS is completed, to the base station [S1012]. The SMC message is integrity-protected with an integrity key of AS.

The UE sends SMC (surety mode complete) message, which means that the key setup of NAS is completed, to the MME [S1013]. This message is integrity-protected with an integrity key of NAS. For the delivery of the SMC message, a UL information delivery message defined on RRC may be used between the base station and the UE. Between the base station and the MME, a UL NAS delivery message defined on S1 space may be used.

The UE performs S1 and S5/S8 session creations [S1014 to S1017].

Figure 11:
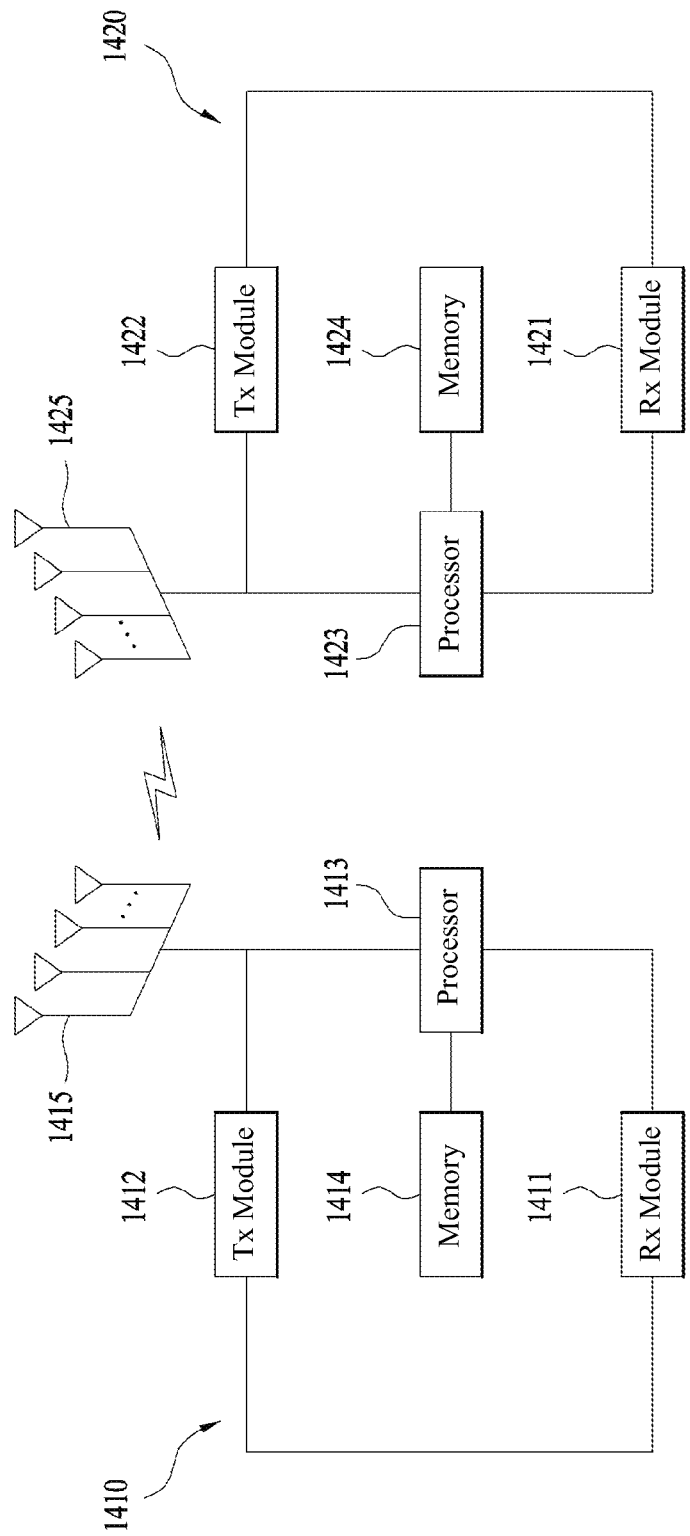
FIG. 11 is a diagram to illustrate a method of setting an authentication and security key according to another embodiment of the present invention.

FIG. 11 is a diagram to illustrate a method of setting an authentication and security key according to another embodiment of the present invention. Description redundant with the former embodiment shall be omitted.

Like FIG. 9, assume that a base station receives an RRC connection request message from a UE and sends an RRC connection setup message to the UE.

Referring to FIG. 11, a base station sends a UE access request message to an MME [S115]. Meanwhile, the base station does not wait for an RRC connection setup complete message from a UE but is able to send an access request message to the MME through an initial UE message defined in S1 Protocol. The UE access request message may contain an IMSI of a user identifier or an IMSI of a new type capable of protecting location privacy. If the base station sends the RRC connection setup message to the UE, it means that contention resolution in a UE's random access is completed. By receiving an existing IMSI, the MME instantly identifies the UE. Or, the MME receives a new IMSI capable of protecting location privacy and is then able to identify the UE by restoring the existing IMSI through the new IMSI.

Having identified the UE, the MME makes a request for authentication information required for UE's authentication to an HSS [S116]. The request for the authentication information may contain an IMSI used in identifying the UE.

The HSS creates authentication information and then sends it to the MME [S117].

The MME transceiver NAS message with the UE, thereby performing mutual authentication [S118, S119].

In order to simultaneously perform AS/NAS key setups for the UE, unlike the embodiment shown in FIG. 10, the MME sends the base station an S1 message containing a fast security key setup indication and NAS security mode command (SMC) specifying the simultaneous key setup of AS/NAS for the UE, UE's security capability, $K_{eNB}$ and the like [S1110]. For instance, to this end, a DL NAS delivery message on S1 interface is used, or a separate S1 message may be newly defined. The fast security setup indication triggers AS security mode command (SMC).

For the SMC delivery of NAS and the key setup of AS layer, an integrated security mode command message is newly defined on an RRC layer. Through the integrated security mode command message, the base station delivers information such as NAS SMC, fast security setup indication, ciphering algorithm for the UE, integrity algorithm and the like to the UE [S110-1].

In order to indicate that the simultaneous key setups of AS/NAS are completed, an RRC message called Integrated SMC (security mode complete) is newly defined. The UE sends the integrated SMC message to the base station [S1111]. The integrated SMC message is protected by AS integrity key and may include an NAS SMC (security mode complete) message protected by NAS integrity key, a fast security setup complete indication and the like.

Having received the integrated SMC from the UE, the base station delivers NAS SMC message protected by NAS integrity key, fast security setup complete indication and the like to the MME in order to inform the MME that the key setup of NAS is completed [S1111-a]. To this end, a UL NAS delivery message defined on S1 interface is used, or a separate additional S1 message may be defined.

The UE performs S1 and S5/S8 session creations [S1112 to S1115].

A delay consumed for authentication and key setup according to the present embodiment is shown in Table 3.

TABLE 3

| Components | Description | Time (ms) |
|---|---|---|
| S105 | Processing Delay in eNB (Uu → S1-C) + S1-C Transfer Delay (→ Initial UE) | 12.5 |
| S106-S107 | {MME Processing Delay (including UE context retrieval of 10 ms) + Transfer Delay (between MME & HSS)} + {HSS Processing Delay + Transfer Delay (between HSS & MME)} (→ Authentication Information Request/Response) | 100 |
| S108-S109 | {MME Processing Delay + Transfer Delay (between MME & UE)} + {Processing Delay in UE + Transfer Delay (between UE & MME)} (→ Authentication Request/Response) | 40 |
| S1010a | MME Processing Delay + Transfer delay (between MME & UE) (→ Security Mode Command) | 14.5 |
| S1010b | MME Processing Delay + S1-C Transfer Delay (+ UE Security Context Transfer) | 13.5 |
| S1011-S1012 | {Processing Delay in eNB + Transmission of Security Mode Command} + {Processing Delay in UE + Transmission of Security Mode Complete} | 22 |
| S1013 | Processing delay in UE + Transfer delay (between UE & MME) (→ Security Mode Complete) | 25.5 |
| | Total Delay (Authentication & AS/NAS Key Setup) | 192.5 (220) |

If the proposed method is adopted, a delay consumed for RACH procedure and authentication & AS/NAS key setup procedure is calculated as '27.5 ms+192.5 ms=220 ms'. This shows about 38% of a delay reduction over the related art delay consumed for RACH, authentication and AS/NAS key setup procedures of LTE/LTE-A. Hence, by reducing the control plane delay of a user equipment using the method proposed by the present invention, services having various low-delay requirements can be provided effectively.

FIG. 12 is a diagram of a user equipment (UE) and a base station according to one embodiment of the present invention. A user equipment and a base station shown in FIG. 11 can perform operations of a user equipment and a base station (or a transmitting point) of the aforementioned embodiments. A base station 1410 may include a receiving module 1411, a transmitting module 1412, a processor 1413, a memory 1414 and a plurality of antennas 1415. A plurality of the antennas 1415 may mean a base station supportive of MIMO transmission and reception. The receiving module 1411 can receive various signals, data and information in uplink from a user equipment. The transmitting module 1412 can transmit various signals, data and information in downlink to the user equipment. And, the processor 1413 can control overall operations of the base station 1410.

The processor 1413 of the base station 1410 performs functions of operating and processing information received by the base station 1410, information to be transmitted by the base station 1410, and the like. The memory 1414 can store the operated and processed information and the like for a prescribed period and can be substituted with such a component as a buffer (not shown in the drawing) and the like.

A user equipment device 1420 may include a receiving module 1421, a transmitting module 1422, a processor 1423, a memory 1424 and a plurality of antennas 1425. A plurality of the antennas 1425 may mean a user equipment device supportive of MIMO transmission and reception. The receiving module 1421 can receive various signals, data and information in downlink from a base station. The transmitting module 1422 can transmit various signals, data and information in uplink to the transmitting point. And, the processor 1423 can control overall operations of the user equipment device 1420.

The processor 1423 of the user equipment device 1420 performs functions of operating and processing information received by the user equipment device 1420, information to be transmitted by the user equipment device 1420, and the like. The memory 1424 can store the operated and processed information and the like for a prescribed period and can be substituted with such a component as a buffer (not shown in the drawing) and the like.

A receiving module of a base station according to one embodiment of the present invention receives an radio resource control (RRC) connection setup request message from a user equipment. Based on the RRC connection setup request message, a processor determines whether the user equipment requests fast authentication, and then authenticates the user equipment. If the user equipment requests the fast authentication, a transmitting module sends international mobile subscriber identity (IMSI) of the user equipment to a mobility management entity (MME) before an RRC connection setup of the user equipment is completed. The processor simultaneously performs NAS (non-access stratum) security key setup and AS (access stratum) security key setup of the user equipment under the control of the MME.

In the above-mentioned detailed configurations of the base station and the user equipment device, the contents or items explained in the descriptions of the various embodiments of the present invention may be independently applicable or at least two embodiments of the present invention may be simultaneously applicable. And, redundant descriptions shall be omitted from the following description for clarity.

The description of the base station 1410 with reference to FIG. 12 may be identically applicable to a relay node device as a DL transmitting entity or a UL receiving entity. And, the description of the user equipment device 1420 with reference to FIG. 12 may be identically applicable to a relay node device as a UL transmitting entity or a DL receiving entity.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are mainly described with reference to examples applicable to 3GPP LTE system and may be applicable to various kinds of wireless communication systems as well as to the 3GPP LTE system.

What is claimed is:

1. A method of performing authentication by a base station with a user equipment in a wireless communication system, comprising; receiving a radio resource control (RRC) connection setup request message from the user equipment; determining, based on the RRC connection setup request message, whether the user equipment has requested fast authentication; when the user equipment has requested the fast authentication, transmitting an international mobile subscriber identity (IMSI) of the user equipment to a mobility management entity (MME) before completion of an RRC connection setup of the user equipment; and authenticating the user equipment under control of the MME, wherein the authenticating the user equipment comprises performing a non-access stratum (NAS) security key setup and an access stratum (AS) security key setup of the user equipment simultaneously.

2. The method of claim 1, wherein determining whether the user equipment has requested the fast authentication comprises:
determining whether at least one of the IMSI and a fast authentication indication is included in the RRC connection setup request message.

3. The method of claim 2, wherein if the IMSI included in the RRC connection setup request message is a type of protecting location privacy of the user equipment, it is determined that the user equipment has requested the fast authentication.

4. The method of claim 2, further comprising:
receiving an RRC connection setup complete message from the user equipment,
wherein if the user equipment has not requested the fast authentication, the IMSI is included in the RRC setup complete message.

5. The method of claim 1, wherein if determined that the user equipment has not requested the fast authentication, the IMSI of the user equipment is transmitted to the MME after completion of the RRC connection setup of the user equipment.

6. The method of claim 1, wherein if determined that the user equipment has not requested the fast authentication, the AS security key setup is performed sequentially after the NAS security key setup has been performed.

7. The method of claim 1, wherein authenticating the user equipment comprises:
delivering, to the user equipment, a first security mode command (SMC) message including the NAS security key setup and the AS security key setup that is received from the MME, in response to a request from the MME.

8. A method of performing authentication by a user equipment with a base station in a wireless communication system, comprising; transmitting a radio resource control (RRC) connection setup request message to the base station; receiving an RRC connection setup message from the base station; transmitting an RRC connection setup complete message; and performing the authentication with the base station, wherein when the user equipment has requested fast authentication, an international mobile subscriber identity (IMSI) of the user equipment is included in the RRC connection setup request message instead of the RRC connection setup complete message.

9. The method of claim 8, wherein performing the authentication with the base station comprises:
if the fast authentication has been requested, performing a non-access stratum (NAS) security key setup and an access stratum (AS) security key setup of the user equipment simultaneously.

10. The method of claim 8, wherein the RRC connection setup request message further includes a fast authentication indication.

11. The method of claim 8, wherein the IMSI included in the RRC connection setup request message is a type of protecting location privacy of the user equipment.

12. The method of claim 8, wherein if the user equipment has not requested the fast authentication, the AS security key setup is performed sequentially after the NAS security key setup has been performed.

13. A base station performing authentication with a user equipment in a wireless communication system, comprising; a receiver to receive a radio resource control (RRC) connection setup request message from the user equipment; a processor to determine, based on the RRC connection setup request message, whether the user equipment has requested fast authentication, and to authenticate the user equipment; and a transmitter to transmit an international mobile subscriber identity (IMSI) of the user equipment to a mobility management entity (MME) before completion of an RRC connection setup of the user equipment, when the user equipment has requested the fast authentication, wherein the processor simultaneously performs a non-access stratum (NAS) security key setup and an access stratum (AS) security key setup of the user equipment under control of the MME.

* * * * *